Oct. 22, 1963

L. J. ADAMS 3,107,577

PANORAMIC MOTION PICTURE PROJECTION APPARATUS

Filed Nov. 21, 1960

INVENTOR.
LELAND J. ADAMS
BY
Attorneys

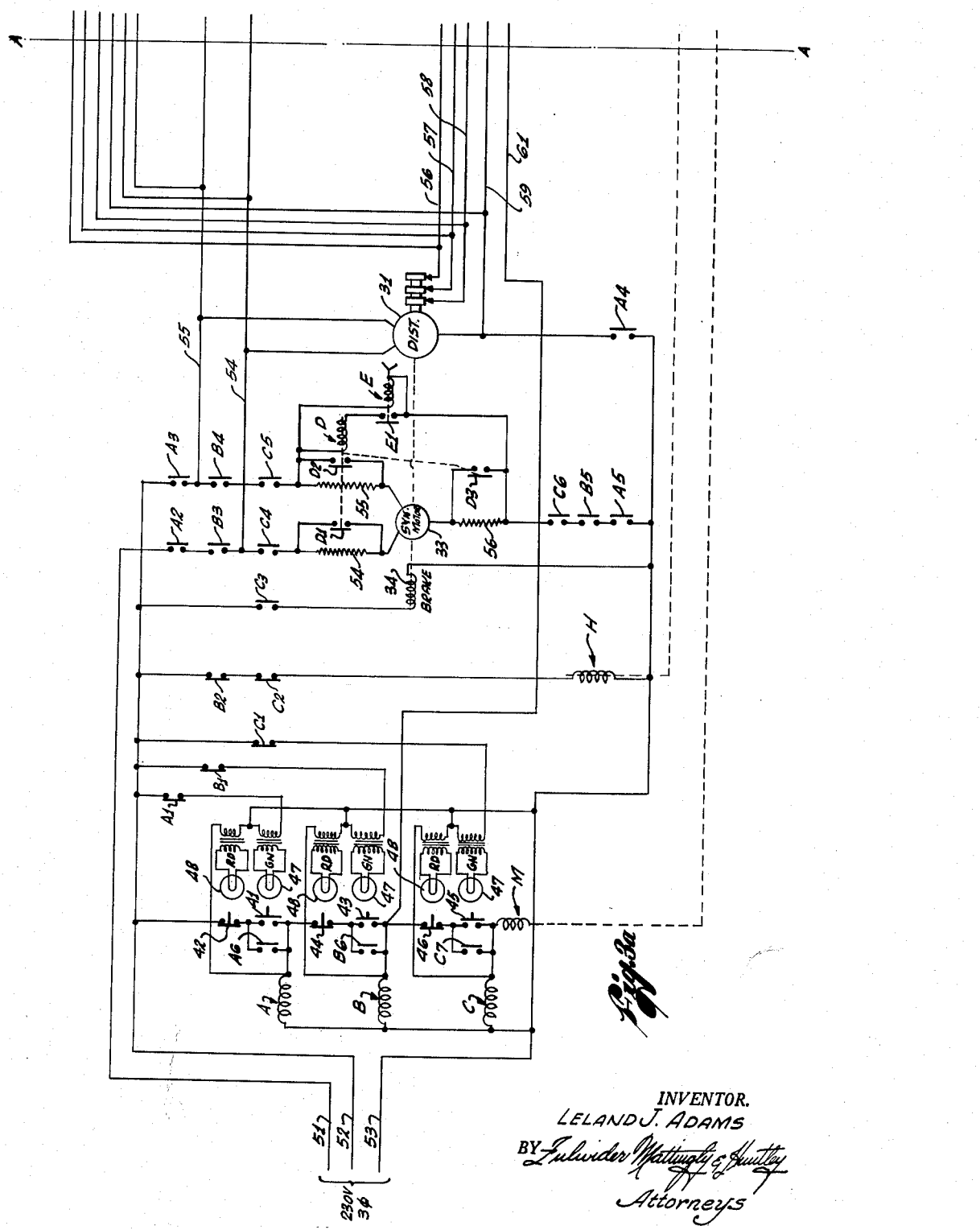

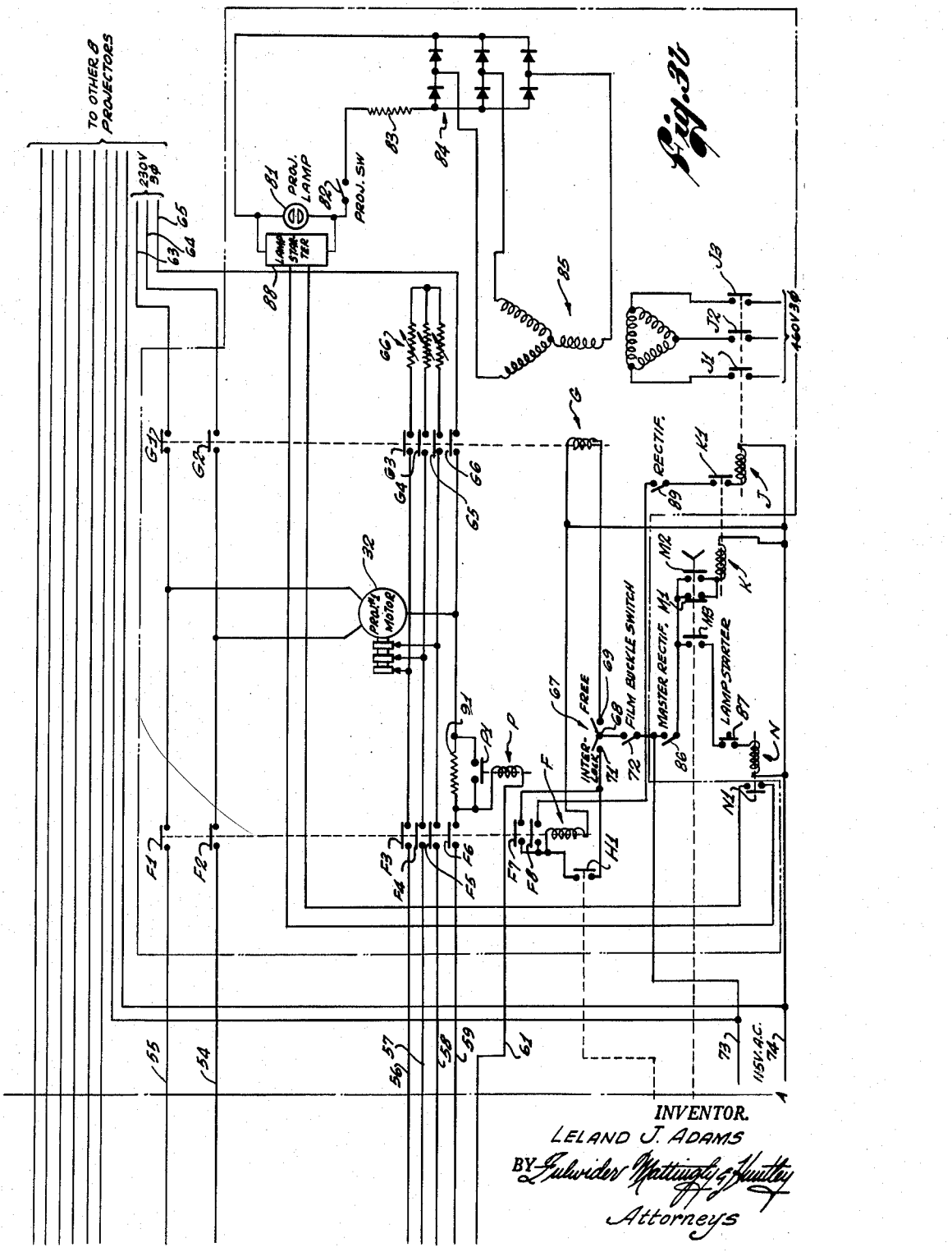

United States Patent Office 3,107,577
Patented Oct. 22, 1963

3,107,577
PANORAMIC MOTION PICTURE PROJECTION
APPARATUS
Leland J. Adams, Granada Hills, Calif., assignor to Walt
Disney Productions, Burbank, Calif., a corporation of
California
Filed Nov. 21, 1960, Ser. No. 70,786
8 Claims. (Cl. 88—16.6)

The present invention relates generally to self-synchronous systems and methods of operation thereof and more particularly to systems and apparatus for the simultaneous projection of a plurality of motion picture scenes to form a mozaic or panoramic view of a particular region.

In such simultaneous projection of the individual motion picture scenes which are fitted together to give a view of an over-all enlarged scene, it is desirable, from the standpoint of the viewing audience securing an impression of a continuous picture, that the individual projectors be synchronized so that properly related images will be projected on the individual viewing screens at the same time. According to the present invention this synchronization of the operation of the individual projectors is accomplished by coupling them together in a self-synchronous electrical system which insures that at any given instant each projector is at the same point in its operating cycle. In coupling the projector drives in the electrical system, it is further desirable that there be a minimum of disturbance to the system.

One object of the present invention is the provision of an improved method and system for starting a self-synchronous rotating system wherein a plurality of self-synchronous receiver motors follow the rotation of a master self-synchronous transmitter.

Another object of this invention is the provision of an improved method and system for starting a self-synchronous rotating system wherein a plurality of self-synchronous receiver motors follow the rotation of a master self-synchronous transmitter in which the receiver motors are brought into their null positions under reduced energization and lowered torque before rotation of the transmitter is initiated.

A further object of this invention is the provision of an improved electrical synchronizing system for a plurality of motion picture projectors which are simultaneously operated to project individual portions of an over-all scene.

A still further object of this invention is the provision of an improved electrical synchronizing system for a plurality of simultaneously operated motion picture projectors employing self-synchronous receiver motors for driving the individual projectors and a common self-synchronous transmitter or distributor, having means for starting the system which insures that the individual receiver motors will come into synchronization with minimum disturbance in the interconnecting self-synchronous system.

Yet another object of this invention is to provide in a self-synchronous interlock system for a plurality of simultaneously operated motion picture projectors, means to insure that rotational energy will be transmitted to the individual projector drives in the starting up of the projectors only when the projector receiver motors are synchronously located at their null points, so that rotation may be initiated with a minimum of electrical disturbance in the self-synchronous system.

Still another object of the invention is the provision of an improved self-synchronous electrical interlocking system for a plurality of simultaneously operated motion picture projectors having means preventing starting of the projector lamps until operation of the projectors is initiated.

These and other objects and features of the invention will be readily apparent to those skilled in the art from the following description of a presently preferred embodiment of the invention and the annexed drawings thereof, in which:

FIGURE 3a is a portion of the wiring diagram for the electrical synchronizing system of the present invention, showing components and circuits which are common to all of the individual projectors and which are not duplicated regardless of the number of the projectors in the system.

FIGURE 3b is a continuation of the wiring diagram of FIGURE 3a with the parts shown within the dot-dash outline individual to each of the projectors and duplicated for each of them.

While the present invention has been illustrated in its application for use in a cycloramic type of theater in which the over-all viewing screen covers a continuous circle of 360°, it will be understood that any number of projectors other than the nine herein illustrated may be used to cover any portion or region of an over-all scene, which may cover any desired arc of view, and which may be projected on flat or curved screens. However, the invention does find its maximum utility where the individual scenes projected by each of a plurality of projectors combine in a mozaic to produce an over-all scene of a general region or view.

Figure 1:
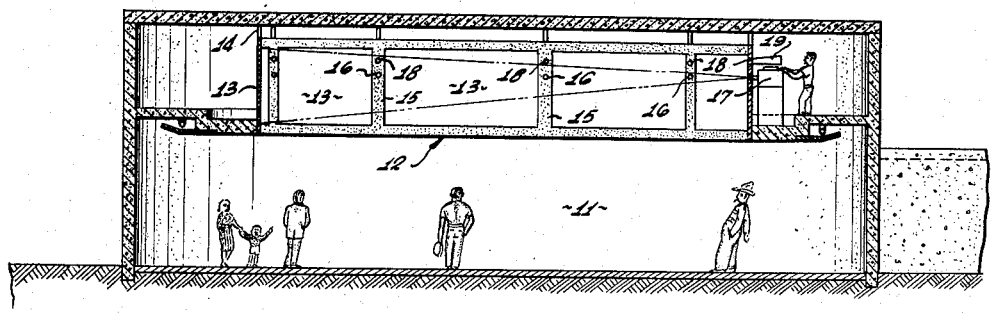
FIGURE 1 is a vertical sectional view through a cycloramic movie theater in which the motion picture projectors may be synchronized in their operation according to the present invention.
Figure 2:
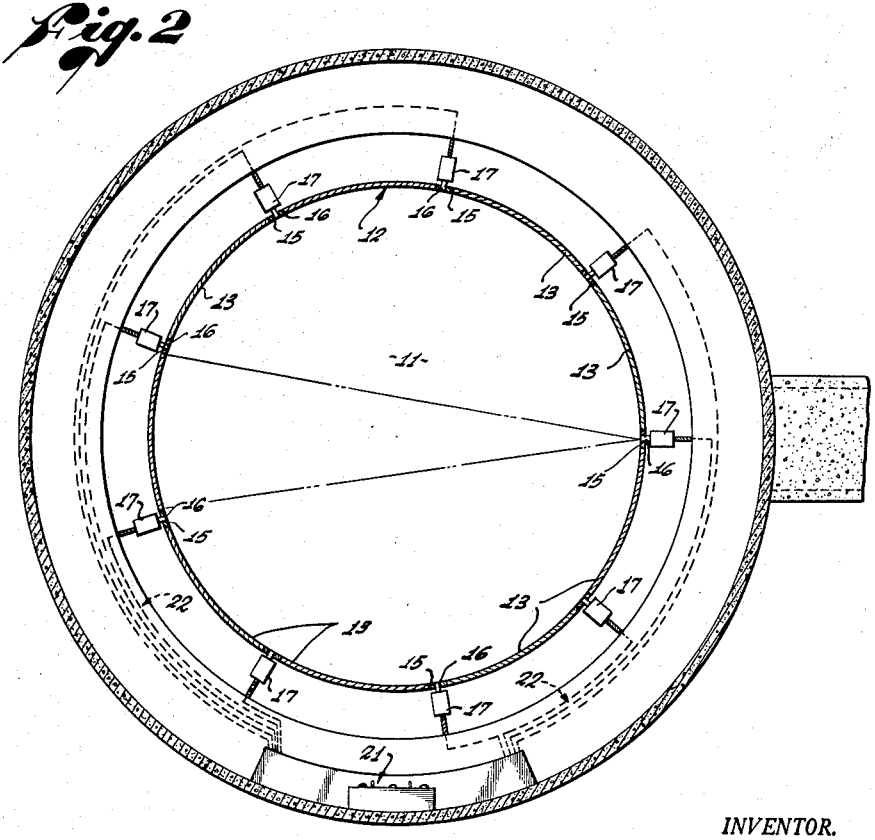
FIGURE 2 is a horizontal sectional view through the cycloramic screen of FIGURE 1 at the projector level.

In the cycloramic theater of FIGURES 1 and 2 there is provided an audience receiving area 11 above which is suspended a cylindrical viewing screen 12 made up of a plurality of individual arcuate screens 13 supported from the roof of the building on a framework 14. The individual screens 13 are separated from each other by non-light reflecting strips 15. Through each of the strips 15 is a lower opening 16 and each of the film projectors 17 has its lens aligned with one of these openings to project an image upon the opposite screen. Each of the strips 15 is also provided with an observation opening 18 which may be covered by a light shielding hood 19. As shown in FIGURE 2, there are preferably an odd number of screens 13 and projectors 17, as specifically illustrated nine, so that each projector 17 projects its scene image substantially diametrically across the circular screen, with each projector directed substantially normally to the chord of its own individual arcuate screen.

Also in FIGURE 2 it is shown that the individual control cables for each of the projectors 17 are led around the outside of the cyclorama to a common control cabinet and panel indicated generally at 21, these control cables being indicated by the dotted lines 22.

The wiring diagram for the electrical synchronization of the projectors 17 is shown in the combined FIGURES 3a and 3b, with those circuits and components shown within the dot-dash outline of FIGURE 3b being duplicated for each of the individual projectors, and the circuits and components exterior to the dot-dash outline of FIGURE 3b, and all of those shown in FIGURE 3a, being common to all of the projectors.

In the wiring diagram the relay operating coils have been related to the contacts which they control by dotted line connections where feasible. This is not done with respect to the three main starting relays in view of the spacing between their contacts which is thought desirable to avoid the complex of wires which would otherwise be required. However, each relay operating coil is readily related to the contacts which it controls by the designation of each relay and its operating coil by a capital letter, thus: A, B, C; while the contacts operated by each relay coil are designated by the prefix letter which identifies that particular relay and operating coil and a number which designates the particular contacts being considered, thus: A1, A2, A3, A4; B1, B2, B3, etc.

In the presently preferred form of the invention, the self-synchronous circuits are controlled from a common transmitter or distributor 31 having its stator winding fed from a three phase supply and its rotor winding connected to the rotor windings of all of the self-synchronous receiver motors for the projectors, one of which, for projector #1, is shown at 32 in FIGURE 3b. The stator windings for the projector receiver motors are also fed from the three phase supply. Preferably, the self-synchronous receiver motors 32 for the projectors 17 are the main drive motors which directly control the operation of the projector parts. Should the requirements for power of the projector motors 32 be too great for a single transmitter or distributor 31 they may be supplied by two or more transmitters or distributors mechanically coupled to operate together. The self-synchronous transmitter 31 is mechanically coupled to be driven by a synchronous motor 33 provided with a conventional brake controlled by a solenoid coil 34.

Three sequentially operated starting relays and their operating coils are designated A, B, and C. Relay A controls the operation of a normally closed contact A1 and of normally open contacts A2, A3, A4, A5 and A6. Relay B controls the operation of normally closed contacts B1 and B2 and of normally open contacts B3, B4, B5 and B6. Relay C controls the operation of normally closed contacts C1 and C2 and of normally open contacts C3, C4, C5, C6 and C7.

Energization of relay A is controlled by a normally open push button 41 and its de-energization by a normally closed push button 42. In the same manner, energization of relay B is controlled by a normally open push button 43 and its de-energization by a normally closed push button 44. Energization of relay C is controlled by a normally open push button 45 and its de-energization by a normally closed push button 46.

The lights and transformers shown to the right of the control push buttons 41 through 46, indicate the energized or de-energized conditions of the relays with which they are associated. Thus in the position illustrated in the drawing, where all of the relays are de-energized, all of the green lights 47 will be illuminated. As each relay is energized, its associated red light 48 will become illuminated and its associated green light will be darkened. The details of this light circuit will be readily apparent from the wiring diagram and are controlled by the normally closed contacts A1, B1 and C1 which, when closed, illuminate the green lights of their associated relays, and which, when opened, illuminate the red lights and darken the green lights of their associated relays.

A three phase supply is provided by the lines 51, 52, and 53 and the synchronous motor 33 is connected thereto by its controlling contacts, initially through starting resistors 54, 55 and 56 which are shorted out by the contacts D1, D2 and D3 of the relay and operating coil shown at D. The relay D is energized through the contacts E1 of a time relay E whose energizing coil is connected across the lines 52—53 when the synchronous motor 33 is initially energized. The self-synchronous transmitter 31 is energized from supply line 53 and from lines 54 and 55 connected to supply lines 51 and 52, respectively, through controlling contacts.

The rotor windings of the self-synchronous transmitter 31 are connected to lines 56, 57, 58, which are controllably connected to the rotor windings of each of the self-synchronous receiver motors 32 constituting the main drive motors for each of the motion picture projectors 17. A line 59 is connected to the supply line 53 through controlling contacts A4 and is controllably connected to the stator winding of the receiver motors 32 through a resistor 91 which is shorted from the circuit by the closing of contact P1 of a relay P whose operating coil is energized across lines 59 and 61. The line 61 is connected to supply line 52 when the relays A and B are energized.

Provision is made for the operation of the projector drive motors as induction motors connected directly to the supply without reference to the self-synchronous transmitter. In the operation of the motor 32 driving projector #1 as a self-synchronous receiver motor, it is controlled by a relay F having contacts F1, F2, F3, F4, F5, F6, F7 and F8. When operating as an induction motor, the projector drive motor 32 is controlled by a relay G having contacts G1, G2, G3, G4, G5 and G6. For energizing the motor 32 in its operation as induction motor, three phase supply lines 63, 64 and 65 are provided. In this induction motor operation the rotor windings of the projector drive motor 32 are connected together through external adjustable resistors 66.

The selection of the manner of operation of the projector drive motor 32 is made at the double throw switch 67 which has a common contact 68 and opposite throw contacts 69 and 71. The common contact 68 is connected through a film buckle switch 72 to one line 73 of a single phase supply, the other line of which is indicated at 74. The film buckle switch is in the nature of a safety switch which will always be closed while the film is properly threaded into the projector and which will automatically open upon breaking of the film.

When it is desired to operate the projector motor 32 as an induction motor, the double throw switch 67 is engaged with contact 69 which places the energizing coil of relay G across lines 73 and 74 through the film buckle switch 72. This closes contacts G1 through G6 to connect the stator of the motor 32 to the lines 63, 64, 65 through contacts G1, G2 and G6, respectively, and which connects the rotor windings of the motor 32 together through the resistors 66 and contacts G3, G4 and G5.

When it is desired to operate the projector drive motor 32 as a self-synchronous receiver motor following the movement of the common self-synchronous transmitter or distributor 31, the double throw switch 67 is moved to engage the contact 71 which places the energization of the operating coil of relay F under the control of the contact H1 of a relay H whose operating coil is energized through the normally closed contacts B2 and C2 (FIGURE 3a).

The circuits energizing the projector lamps will now be described:

The lamp for projector #1 is shown at 81 and, while it may be any type, is herein preferably a gas filled lamp, for example, a Xenon filled lamp. This lamp is connected through a manual control switch 82 and a voltage dropping resistor 83 to the output of a three phase rectifier bridge 84. The bridge 84 is fed by the output of a Delta-Y connected transformer 85 whose primary is energized through the contacts J1, J2 and J3 of a relay J whose operating coil is energized through the contacts K1 of a relay K and a manual switch 89. The operating coil of the relay K is energized across the lines 73 and 74 through the normally closed contacts M1 or the normally open contacts M2 of a relay M whose operating coil is connected across the supply lines 52—53 when all of the relays A, B and C are energized. The circuit through contacts M1 or M2 to the line 73 is completed through a manually operated master rectifier switch 86. The relay M operates immediately upon energization and with a time delay after de-energization. It includes a third set of contacts M3 in the lamp starter circuit, which includes a push button starting switch 87 controlling the energization of the operating coil of the relay N. The contacts N1 of relay N control an energizing circuit in the lamp starter 88 designed to place a high starting voltage across the electrodes of the projector lamp 81.

The starting of the system to effect synchronized simultaneous operation of the projectors to provide for the synchronous projection of their individual scene images for incorporation in the panorama or cyclorama will now be described:

It is assumed that the projectors have their films properly threaded therein and placed in starting position with theh starting frames of each of the films properly indexed within their projectors; also that the supply lines are properly energized.

In initiating the starting of the system, the various manual and selective switches are first operated for the projector operation desired and are now first described with respect to the energization of the projector drive motors as self-synchronous receiver motors whose rotor windings are energized from the rotor windings of the common self-synchronous transmitter 31. With the film properly threaded into projector #1 the film buckle switch 72 will be closed. The double throw selector switch 67 is operated to engage contact 71 and this immediately energizes the operating coil of the relay F through the contact H1 which closed upon energization of the supply circuit, at which time the operating coil of relay H was energized through the normally closed contacts B2 and C2 across lines 52 and 53.

Energization of the operating coil of the relay F operates its contacts to closed position as follows: contacts F1, F2 and F6 close to connect the stator windings of the projector self-synchronous receiver motor 32 across the lines 54, 55 and 59, the line 59 being connected through a resistor 91. The closing of contacts F3, F4 and F5 connects the rotor windings of the motor 32 to the lines 56, 57 and 58. Closing of contact F7 places a holding circuit around contact H1. Contact F8 closes to prepare a circuit to the operating coil of relay J.

The projector lamp switch 82 is closed to complete the circuit from the rectifier bridge 84 to the lamp 81. The manual switch 89 is closed to further prepare the circuit for energization of the operating coil of relay J. The master rectifier switch 86 is closed to energize the operating coil of relay K through the normally closed contact M1 and it operates to close its contacts K1, etc. This energizes the operating coil of relay J to close its contacts J1, J2 and J3 and energize transformer 85. This places a rectified D.C. voltage across the electrodes of the lamp 81 which is insufficient, however, to initiate operation of the lamp, the voltage applied being of the order of 75 volts D.C.

As previously stated, all of the components and circuitry within the dot-dash outline of FIGURE 3b are duplicated for each of the projectors in the cyclorama so that in the above operation switches 82 and 89 and double throw selector switch 67 are provided for each of the projectors and will be operated to their closed or selected positions as described for projector #1. Also, the contacts for the relays H and K are duplicated for each of the projectors so that when contacts H1 and K1 are operated there will be operated therewith contacts H2 through H9 and contacts K2 through K9 for the other eight projectors in the cyclorama.

The next operation in the starting cycle is the closing of the push button switch 41 to energize the operating coil of the relay A and effect operation of the contacts A1 through A6 thereof. Contact A1 opens to extinguish the lamp 47 of push button switch 41 and illuminate the lamp 48 of push button switch 42. The closing of contact A2 has no effect in view of open contact B3. The closing of contact A3 connects the line 55 to the supply line 52 and the closing of contact A4 then places a single phase supply across the stator winding of the self-synchronous transmitter or distributor 31. The closing of contact A5 has no effect in view of open contacts B5 and C6. The closing of contact A6 places a holding circuit around push button 41. The closing of contact A4 also connects the line 59 to the supply line 53.

With the operation of relay A a single phase supply is placed upon the stator windings of the master self-synchronous transmitter 31, and the stator windings of the projector self-synchronous receiver motor 32 are also energized from this single phase supply but through the selsyn operation current limiting resistance 91. A reduced synchronizing torque is thus initially placed upon the rotors of the receiver motors 32 to bring them to their null positions with a minimum of electrical disturbance in the self-synchronizing system.

The next step in the starting operation is the closing of push button switch 43 to energize the operating coil of relay B, which operates its contacts B1 through B6 as follows: The opening of contact B1 extinguishes the green light 47 at push button switch 41 and illuminates the red light 48 associated with the push button switch 44. Opening of contact B2 de-energizes the operating coil of relay H to open its contacts H1 through H9, but this has no effect on the energization of relay F which applied a holding circuit around contact H1 through its contact F7. Closing of contact B3 connects the line 54 to the supply line 51 to supply three phase energization to the stator windings of the master self-synchronous transmitter 31 and the receiver motors 32. Closing of contacts B4 and B5 has no effect in view of the still open contacts C5 and C6. Closing of contact B6 places a holding circuit around the push button switch 43.

The closing of push button switch 43 energizes the line 61 from the supply line 52 to energize the operating coil of relay P across the lines 59 and 61. Operation of the relay P closes its contacts P1 to short out the starting resistance 91 and connect the stator windings of the projector receiver motor 32 directly to the line 59. It is seen that the self-synchronizing circuit is now fully energized with the stators of the master transmitter 31 and of the individual receiver motors 32 connected directly across the three phase supply and with the rotor winding of the master transmitter 31 connected to the rotor windings of the individual receiver motors 32. Full synchronizing torque will thus be exerted upon all of the receiver motor rotors.

Push button switch 45 is now closed to energize the operating coil of relay C which operates its contacts as follows: Contact C1 opens to reverse the illumination of the lights 47 and 48 at the relay C. Contact C2 opens with no effect as contact B2 is already open. Closing of contact C3 energizes the solenoid 34 to release the brake on the synchronous motor 33. Closing of contacts C4, C5 and C6 energizes the synchronous motor 33 through the starting resistances 54, 55 and 56. At the same time, the operating coil of relay E is energized and, after a predetermined time delay, its contacts E1 close to energize the operating coil of relay D. This closes contacts D1, D2 and D3 to connect the synchronous motor 33 directly across the supply, after which it will operate to drive the master self-synchronous transmitter 31 at synchronous speed. As soon as the synchronous motor starts rotating, its rotation of the rotor of master self-synchronous transmitter 31 will be duplicated in the self-synchronous rotation of the rotors of the receiver motors 32 at each of the projectors in the cyclorama.

The closing of push button switch 45 energizes the operating coil of relay M to close contact M2 and establish a holding circuit about M1, which opens. Contact M3 closes to prepare the circuit to the lamp starter push button switch 87.

With the projector motors now in operation, the push button lamp starter switch 87 is closed to energize the operating coil of relay N which in turn closes its contacts N1 through N9 to energize the lamp starters 88 for all of the projector lamps 81. The lamp starters temporarily apply a high voltage across the electrodes of the lamps 81 to effect ignition thereof and, once started, the lamps continue to operate with the voltage across their electrodes dropped to substantially 49 volts D.C. through the resistors 83. When the projector lamps have been started, the push button switch 87 is released to effect de-energization of the relay N and opening of the circuits to the lamp starters 88.

The selector double throw switch 67 provides for non-synchronous operation of any of the projector motors 32, as desired. In this operation the selector switch is moved to engage the contact 69 and, if the film buckle switch 72 is closed, this energizes the operating coil of relay G across the lines 73—74. The closing of contacts G1, G2 and G6 connects the stator winding of the motor 32 across the lines 63, 64 and 65, and the closing of contacts G3, G4 and G5 connects the rotor windings together through the adjustable resistors 66. It is to be noted that this operation is entirely independent of the relays A, B and C, requiring only the throwing of the selector switch 67 into the position to engage contact 69 and that the film buckle switch be closed, as it normally will with film threaded in the projector.

With the above starting operation carried out, the stopping and starting of the projectors for successive shows can be effected at push button switches 46 and 45, respectively. Opening of switch 46 will de-energize the synchronous motor 33 and set the brake controlled by the solenoid 34 so as to stop rotation of the master self-synchronous transmitter 31. However, if relays A and B remain energized, the self-synchronous transmitter and the self-synchronous receiver motors will be locked in synchronization since all of the stator windings thereof will remain connected to the supply lines and the rotor windings will continue interconnected through the contacts of the relays F, which are energized so long as the film buckle switches 72 are closed and the double throw selector switches 67 are in the position to engage the contacts 71. The control of the system through the push button switches 45 and 46 will be the normal operation for short intervals between successive shows. For longer intervals all of the relays A, B and C would be de-energized and the manual switches opened so that starting operation would be effected as originally described.

Should a double throw selector switch 67 be open at the contact 71 while either of the relays B and C is energized, the projector motor 32 associated with that selector switch cannot be energized by closing contact 71 until both relays B and C are first de-energized. It would be undesirable to connect this unsynchronized receiver motor in the self-synchronous system without first stopping the system and reducing its energization so as to bring the rotor of the newly connected receiver motor to its null position under reduced torque and with minimum electrical disturbance in the system. Should a relay contact F7 open at any time, there is no longer a holding circuit around contact H1 and, if this is open because of de-energization of the relay H by the opening of either or both of the contacts B2 or C2, then the relay F cannot be re-energized since the circuit to its operating coil cannot be completed through either H1 or F7. Hence, to restart a projector after it has been disconnected by the de-energization of the operating coil of relay F at either the double throw selector switch or the film buckle switch, requires that at least relays B and C be de-energized so as to close contacts B2 and C2, energize the operating coil of relay H and close contact H1. Thereafter, if the film buckle switch and the double throw selector switch are closed, the relay F will be energized through H1. However, by the de-energization of relays B and C the system has been brought back into reduced energization so that the positioning of the rotor of the receiver motor at its null point is effected at low torque to avoid electrical disturbance in the self-synchronizing system.

In stopping projector operation it is always desirable to open relay C first and to maintain relays A and B closed at least until the rotary elements are brought to rest. This will insure that the projectors drive motors 32 remain in synchronism as they slow down and that the rotors of the motors will be at their null points with respect to the transmitter 31 when the system comes to rest. Should the energization of the self-synchronous system be interrupted while the elements are in motion, it will be apparent that the coasting of the projector motors to rest will not be identical and that they will be in haphazard positions when they come to a stop. Of course, the system could be brought back into synchronized lock by the sequential closing of the relays A and B, but once the system is in synchronized lock, it is ordinarily maintained so by controlling the stopping and starting of the projectors by the opening and closing of the relay C alone.

While a certain presently preferred embodiment of the invention has been specifically shown and described herein, it will be understood that the invention is not limited thereto as many variations will be apparent to those skilled in the art and the invention is to be given its broadest interpretation within the terms of the following claims.

I claim:

1. A system for effecting synchronized movement of a plurality of mechanically independent drives comprising: a self-synchronous receiver motor for each of said drives; a common self-synchronous transmitter for all of said receiver motors; means electrically connecting and disconnecting said receiver motors to said transmitter; means applying a reduced energization to said transmitter while it is at rest to bring the receiver motor rotors to their null points under reduced torque; means applying full energization to said transmitter after the receiver motor rotors are positioned adjacent to their null point; means preventing the electrical connection of a receiver motor to the transmitter while the transmitter is fully energized so as to prevent the pulling of a receiver motor rotor to its null point under full synchronizing torque; and means for rotating said transmitter at a predetermined speed to effect synchronous rotation of said receiver motors therewith, with the instantaneous position of the receiver motor rotors continuously following substantially the instantaneous position of the transmitter rotor so that said drives will always be in substantially the same instantaneous mechanical position.

2. A system for effecting synchronized movement of a plurality of mechanically independent drives comprising: a self-synchronous receiver motor for each of said drives; a common self-synchronous transmitter for all of said receiver motors; means electrically connecting and disconnecting said receiver motors to said transmitter; means applying a reduced energization to said transmitter while it is at rest and energizing said receiver motors through resistances to bring the receiver motor rotors to their null points under reduced torque; means applying full energization to said transmitter and shorting out said resistances after the receiver motor rotors are positioned adjacent to their null point so as to apply full synchronizing torque thereto; means for rotating said transmitter at a predetermined speed to effect synchronous rotation of said receiver motors therewith, with the instantaneous positions of the receiver motor rotors continuously following substantially the instantaneous position of the transmitter rotor so that said drives will always be in substantially the same instantaneous mechanical position; and means preventing the electrical connection of a receiver motor to the transmitter while the transmitter is fully energized so as to prevent the pulling of a receiver rotor into synchronous lock under full synchronizing torque.

3. Motion picture projection apparatus comprising: a plurality of motion picture projectors directed toward adjacent screens so that their individual pictures may be combined into a panoramic view; a self-synchronous receiver motor driving each of said projectors; a common self-synchronous transmitter for said receiver motors; means for electrically connecting and disconnecting said receiver motor to said transmitter; means for applying reduced energization to said transmitter while it is at rest to bring the receiver motor rotors to their null points under reduced torque; means for applying full energization to said transmitter after the receiver motor rotors are positioned adjacent to their null points; means for rotating said transmitter at a predetermined speed to effect synchronous rotation of the projector driving receiver motors therewith so that the individually projected pictures will combine into a panoramic scene; and means preventing the electrical connection of a receiver motor to the transmitter while the transmitter is fully energized so as to prevent the pulling of a receiver motor rotor into synchronous lock under full torque.

4. Motion picture projection apparatus comprising: a plurality of motion picture projectors directed toward adjacent screens so that their individual pictures may be combined into a panoramic view; a self-synchronous receiver motor driving each of said projectors; a common self-synchronous transmitter for said receiver motors; means for electrically connecting and disconnecting said receiver motors to said transmitter; means for applying reduced energization to said transmitter while it is at rest to bring the receiver motor rotors to their null points under reduced torque; means for applying full energization to said transmitter after the receiver motor rotors are positioned adjacent to their null points; means for rotating said transmitter at a predetermined speed to effect synchronous rotation of the projector driving receiver motors therewith so that the individually projected pictures will combine into a panoramic scene; means preventing the electrical connection of a receiver motor to the transmitter while the transmitter is fully energized so as to prevent the pulling of a receiver motor rotor into synchronous lock under full torque; a lamp starting circuit for each of said projectors; and means preventing energization of said lamp starting circuits until rotation of said transmitter is initiated.

5. A system for operating a plurality of motion picture projectors in synchronism so that their individual pictures may be combined in an over-all panoramic view comprising: a self-synchronous receiver motor driving each of said projectors; a common self-synchronous transmitter for said receiver motors; means for electrically connecting and disconnecting said receiver motors to said transmitter; means for applying reduced energization to the self-synchronous system formed by said common transmitter and said plurality of receiver motors while it is at rest so that with connection of the receiver motors to the transmitter and the application of the reduced energization the receiver motor rotors will be brought into their null points under reduced torque; means for applying full energization to said self-synchronous system after the receiver motor rotors are positioned adjacent to their null points; means for rotating said transmitter at a predetermined speed to effect synchronous rotation of the projector driving receiver motors therewith so that their individual pictures will be maintained in synchronism and may be collectively viewed; and means preventing the electrical connection of a receiver motor to the transmitter when the transmitter and receiver motor are fully energized so as to prevent the pulling of a receiver rotor into synchronous lock under full torque.

6. A system for operating a plurality of motion picture projectors in synchronism so that their individual pictures may be combined in an over-all panoramic view comprising: a self-synchronous receiver motor driving each of said projectors; a common self-synchronous transmitter for all of said receiver motors; means for electrically connecting and disconnecting said receiver motors to said transmitter; means for applying reduced energization to the self-synchronous system formed by said common transmitter and said plurality of receiver motors while it is at rest so that with connection of the receiver motors to the transmitter and the application of the reduced energization the receiver motor rotors will be brought into their null points under reduced torque; means for applying full energization to said self-synchronous system after the receiver motor rotors are positioned adjacent to their null points; means for rotating said transmitter at a predetermined speed to effect synchronous rotation of the projector driving receiver motors therewith so that their individual pictures will be maintained in synchronism and may be collectively viewed; means preventing the electrical connection of a receiver motor to the transmitter while the transmitter is fully energized so as to prevent the pulling of a receiver motor rotor into synchronous lock under full torque; a lamp starting circuit for each of said projectors; and means preventing energization of said lamp starting circuits until rotation of said transmitter is initiated.

7. A system for effecting synchronized movement of a plurality of mechanically independent drives comprising: a self-synchronous receiver motor for each of said drives; a common self-synchronous transmitter for all of said receiver motors; means electrically connecting and disconnecting said receiver motors to said transmitter; means for applying reduced energization to the self-synchronous system formed by said common transmitter and said plurality of receiver motors while it is at rest with said receiver motors connected to said transmitter so as to bring the receiver motor rotors to their null points under reduced torque; means for applying full energization to said self-synchronous system after the receiver motor rotors are positioned adjacent to their null points; means preventing the electrical connection of a receiver motor to the transmitter while the transmitter and receiver motor are fully energized so as to prevent the pulling of a receiver motor rotor to its null point under full synchronizing torque; and means for rotating said transmitter at a predetermined speed to effect synchronous rotation of said receiver motors therewith, with the instantaneous position of the receiver motor rotors continuously following substantially the instantaneous position of the transmitter rotor so that said drives will always be in subtsantially the same instantaneous mechanical position.

8. Motion picture projection apparatus comprising: a plurality of motion picture projectors directed toward adjacent screens so that their individual pictures may be combined into a panoramic view; a self-synchronous receiver motor driving each of said projectors; a common self-synchronous transmitter for said receiver motors; means for electrically connecting and disconnecting said receiver motors to said transmitter; means for applying reduced energization to the self-synchronous system formed by said common transmitter and said plurality of receiver motors while it is at rest so that with connection of the receiver motors to the transmitter and the application of the reduced energization the receiver motor rotors will be brought into their null points under reduced torque; means for applying full energization to said self-synchronous system after the receiver motor rotors are positioned adjacent to their null points; means for rotating said transmitter at a predetermined speed to effect synchronous rotation of the projector driving receiver motors therewith so that the individually projected pictures will combine into a panoramic scene; and means preventing the electrical connection of a receiver motor to the transmitter while the transmitter and receiver motor are fully energized so as to prevent the pulling of a receiver motor rotor into synchronous lock under full torque.

References Cited in the file of this patent

UNITED STATES PATENTS

| | | |
|---|---|---|
| 1,867,373 | Morton | July 12, 1932 |
| 1,922,885 | De Vries | Aug. 15, 1933 |
| 2,310,339 | Arndt | Feb. 9, 1943 |
| 2,434,201 | Engelken | Jan. 6, 1948 |
| 2,698,408 | Elwell | Dec. 28, 1954 |

(Other references on following page)

UNITED STATES PATENTS

| | | |
|---|---|---|
| 2,711,668 | Dresser | June 28, 1955 |
| 2,844,070 | Dresser | July 22, 1958 |

FOREIGN PATENTS

| | | |
|---|---|---|
| 658,965 | Great Britain | Oct. 17, 1951 |

OTHER REFERENCES

Shoults, Rife and Johnson: Electric Motors in Industry, pages 168–178; John Wiley & Sons, Inc., New York, 1942.

Schupp, Ernst: Electrisches Schaltzeug, pages 1–5; Walter De Gruyter & Co., Berlin and Leipsig, 1927.